United States Patent  [15] 3,655,483
Borrel et al.  [45] Apr. 11, 1972

[54] PROCESS OF MANUFACTURING STRATIFIED MATERIALS OF GLASS FIBERS AND POLYESTERS USING ULTRA-VIOLET IRRADIATION

[72] Inventors: Philippe Borrel; Jean Lehureau, both of Lyon, France

[73] Assignee: Progil, Paris, France

[22] Filed: June 10, 1970

[21] Appl. No.: 45,007

[30] Foreign Application Priority Data

June 12, 1969 France..................................6919610

[52] U.S. Cl...........................156/272, 117/93.31, 161/195, 161/233, 161/412, 204/159.19
[51] Int. Cl......................................B32b 27/16, C08f 1/20
[58] Field of Search................117/93.31; 156/272; 161/195, 161/233, 412; 204/159.19

[56] References Cited

UNITED STATES PATENTS 3,582,487  6/1971  Fuhr et al. ..........................204/159.15

FOREIGN PATENTS OR APPLICATIONS 611,764  1/1961  Canada..............................204/159.19

OTHER PUBLICATIONS

" New Way to Extend Polyester Pot-Life," J. Kaminetsky et. coll., Plastics Technology, June, 1961 pp. 39-46

Primary Examiner—John T. Goolkasian
Assistant Examiner—Robert A. Dawson
Attorney—Browdy and Neimark

[57]  ABSTRACT

A laminate of improved properties is obtained by photopolymerization of a polyester in two stages including an intense but brief first stage and a longer less intense second stage, whereby the ethylenically unsaturated monomer migrates in part to the surface of the laminate.

7 Claims, 1 Drawing Figure

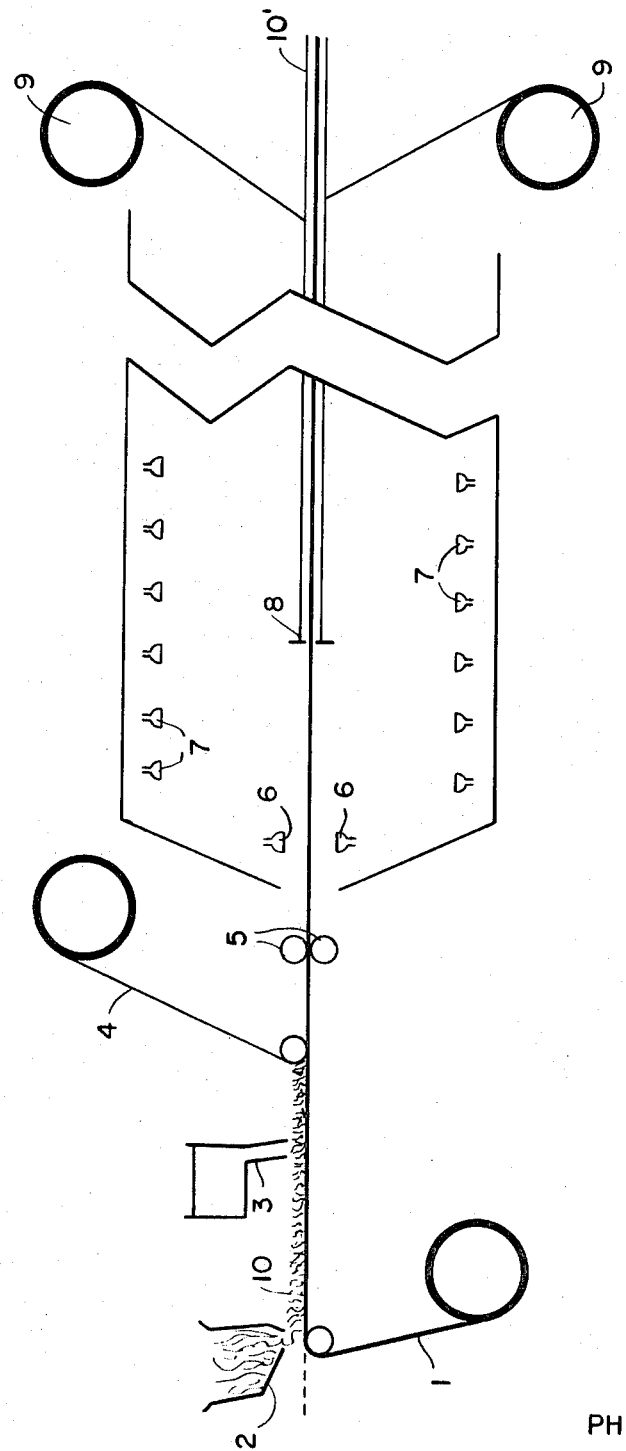

PROCESS OF MANUFACTURING STRATIFIED MATERIALS OF GLASS FIBERS AND POLYESTERS USING ULTRA-VIOLET IRRADIATION

The present invention relates to a new process of obtaining stratified or laminated materials of glass fibers and unsaturated polyesters, by photopolymerization. It has, more especially, an object of providing techniques of continuous polymerization, under luminous irradiation, to obtain stratified materials having improved characteristics.

There has already been described the manufacture of laminated materials in reinforced plastic material, by photopolymerization at room temperature, under ultra-violet radiation lamps and in the presence of an initiator, as for example benzoin, of stratified layers of glass fibers or fabrics impregnated with an unsaturated polyester resin, that is, with a dilution in a polymerizable ethylenically unsaturated monomer as for example, styrene or a polycondensate obtained from polyols and unsaturated polyacids in the presence possibly of saturated polyacids. (J. Kaminetsky et coll. Plastics technology, pages 39–46 June 1961).

The properties obtained for stratified substances are comparable to the ones of materials made according to traditional means of thermal polymerization in the presence of free radical generating catalysts. Mechanical properties and chemical resistance depend essentially upon the composition of used resin, and especially upon the content in cross-linking ethylenically unsaturated monomer. So, it is possible to improve scratching and hydrolysis resistance by increasing the content in this monomer, as for example styrene. Inversely, shock and flexion resistances are improved by decreasing the content of this monomer. In order to have an arrangement for obtaining stratified materials having intermediary characteristics, assemblies having several layers of glass fibers or fabrics impregnated with polyester resins having different compositions may be provided. However, those techniques are expensive and difficult to apply because of adhesion difficulties between the different layers.

It has now been found that it is possible to obtain, with a resin of given composition, stratified materials the faces of which have a hardness and a resistance with regard to hydrolysis greater than the one which would normally be reached with use of these resin compositions.

It has, indeed, been found that if there is first applied, during a short enough time, an intense luminous radiation on the two faces of the stratified material to harden, in the presence of a photo-sensitizing agent and that thereafter irradiation intensity is decreased, there results an attraction or migration of the ethylenically unsaturated monomer of the polyester resin from the center up to the faces of the stratified material. So, for example, when starting, for impregnating the glass fiber or fabric from a composition containing 40% of styrene for 60% (by weight) of diol/diacid polycondensate, the styrene content on stratified material faces may pass from 40 to 42 and even 43% by the use of the process according to the invention. Such a composition variation provides composite materials having surface properties and the characteristics of which may be modified at will in using as a raw material a polyester resin having always the same initial content of polymerizable cross-linking monomer.

This exposure of the stratified material at two successive times to different irradiation intensities, which is a characteristic feature of the invention, may practically be accomplished by a convenient disposition of the used luminous sources. A convenient and especially advantageous way consists of passing the polyester/glass fibers mass between series of ultra-violet radiation lamps having given wave lengths, generally comprised between 1,500 and 5,000 angstroms, the first bank of lamps being placed between 5 and 25 cms from the surface to be irradiated in order to obtain an intensity of between 1–5 watts/cm$^2$, while the second bank is placed at a further distance, generally 30 to 100 cms, from such surface to obtain an intensity of between 0.9 and 0.01 watts/cm$^2$. The radiation intensity is calculated by dividing the electrical force consumed at the lamp binding posts (power input) by the illuminated surface.

It is possible to use, for the present invention, any unsaturated polyester resin of known type, that is solutions in a monomer or mixture of polymerizable ethylenically unsaturated monomers such as styrene, vinyl acetate, an acrylic compound, etc., of unsaturated diacids or anhydrides polycondensates, with possibly saturated acids, as maleic or phthalic anhydride, ortho, iso or terephthalic acid, sebacid acid, adipic acid, etc., with a diol such as ethylene-glycol or propylene glycol. Unsaturation rate of the used polycondensate may vary in a general way, from 0.1 to 10. Moreover, the content of polymerizable monomer in the resin may vary from 25 to 70% by weight.

The unsaturated polyester resin is added with a quantity generally comprised between 0.01 and 10% of its weight — preferably 0.05 to 2% — of a polymerization photo-initiating agent. Among the initiating agents of known type may be mentioned diacetyl, dibenzoyl, benzophenone or, better, benzoin or a benzoin alkyl ether, as for example, benzoin propyl, ethyl, methyl ethers.

It is sometimes advantageous to add to the photo-initiating agent a substance playing the part of ultra-violet absorption regulator. It has indeed been found that in some cases the presence of an absorber of ultra-violet rays increases the effect of concentration variation, i.e., the migration of the polymerizable monomer from the center up to the faces of the stratified material, when used in the present process. The regulating substance is chose among the known compounds soluble in the polyester resin and having a strong absorption between 2,000 and 4,000 angstroms. Among those compounds, introduced in amounts from 0 to 1% of the resin weight, may be mentioned, in a non-limitative way, orthohydroxybenzophenone and its derivatives, phenyl salicylate and its derivatives, phenylbenzotriazole and its derivatives, etc.

Moreover, it is not incompatible with techniques according to the invention to add to the resin, radical polymerization initiating agents of known type, such as azobis-isobutyronitrile, in a convenient quantity, or organic peroxides such as benzoyl peroxide, cyclohexanone, etc.

Glass fibers usable in techniques according to the invention may present themselves in all the well know forms, that is continuous filaments, fabrics, cut fiber felts (or "glass mat"), etc. The content in resin of glass and resin mixture is generally regulated between 20 and 90%, and more especially between 50 and 80% resin.

The thickness of stratified substances able to be fabricated is limited only by light penetration. This thickness usually varies between 0.5 and 5 mms but it may reach several centimeters.

The process according to the invention may be applied according to the known continuous fabrication techniques for stratified materials. However, it is especially advantageous to use the following operative modes, the description of which is illustrated by the attached drawing.

On a substrate-support, constituted for example of regenerated cellulose or a terephthalic polyester, there is placed a glass fiber mat 10 fed in such as through a hopper 2. The polyester resin with its initiating agent — and possibly its regulator — of photopolymerization is then fed to the mat 10 from the hopper 3. Then the impregnated mat is covered with a second sheet 4 of plastic material, for example of the same type as 1, and air bubbles are removed by passing of the whole assembly through pressing rolls 5. Then photopolymerization is achieved according to the characteristics of the present invention, and the realization mode of which is described hereinafter.

There is placed at location 6, at a distance near the material, for example about 5 to 20 cms., — lamps emitting a light having a convenient wave — length for the used photo-initiator. The distance and intensity of those lamps are regulated to luminous regard to the material passing speed, in order to provide a slight surface gelation of the resin while the inside of the laminated part remains fluid. Exposure time is generally short, from about 5 to 20 seconds. Other lamps 7, placed equally on both sides of the material to be polymerized, are at a greater distance, for example from 30 to 100 cms. and allow the progressive hardening of the sandwich-material whereas a diffusion of the monomer contained in the resin is made from the center up to surface proximity. During this second exposure to luminous radiations, which lasts generally from 5 to 20 minutes, the stratified material may be put in the desired form for example in the for of corrugated plate with the help of a shaping machine 8 according to classical techniques. Then it is sufficient to recover the support-sheets 1 and 4 by winding them around spindles 9, and to proceed to sawing and cutting operations of final stratified substance 10'.

According to a process variant (not illustrated) it is possible first to coat the support-sheet 1 with polyester resin, then to proceed immediately to a pre-gelation by means of luminous radiations during a very short time. Then glass fibers mat resin and sheet 4 also coated with resin and pre-gelled as sheet 1 are set; the operations are pursued in the same way as previously, except the operations lamps 6 are not needed.

EXAMPLE 1

An unsaturated polyester resin was prepared by dissolving 60 parts (weight) of a polycondensate of 1 mole of phthalic anhydride and 1 mole of maleic anhydride with 2.2 moles of propylene-glycol, in 40 parts of styrene. To the solution was added 0.02% of hydroquinone as a stabilizing agent and 0.2% of benzoin methyl ether as a photo-initiator.

The resin was used to impregnate a glass fiber mat of 450 g/m$^2$ in order that a mixture by weight of 25% of glass and 75% of resin was obtained. The corresponding thickness was about 1.5 mm.

The operation was carried out under the same conditions as set forth in the description of the figure by adopting a passage speed of about 2 m/min. for the composite material. Support sheets 1 and 4 were constituted of a terephthalic polyester (registered trademark "Mylar"). The first mercury vapor lamps 6 providing radiation in the range of 1,500–5,000 angstroms were placed on each side of the laminated part at a distance from 10 cms, providing an intensity of 2.5 watts/cm$^2$ with an irradiation time of 10 seconds. Other series of lamps 7 were placed at 50 cms to provide an intensity of 0.4 watts/cm$^2$ and the irradiation period was 10 minutes.

As reference operations, a process was carried out exactly with the same quantities of materials and in the same conditions except that, in a first case (sample $t_1$) all the lamps were placed at 10 cms with an irradiation time of 10 minutes, and in a second case (sample $t_2$) all the lamps were placed at 50 cms of the composite material, in adopting the same irradiation time.

For the stratified material according to the invention (i) and the two samples (t and $t_2$) there was measured on one hand styrene content at the surface, by measures of multiple reflection in infra-red, then on the other hand flexion resistance and water absorption rate.

Flexion resistance was measured on samples 1.5 mm thick according to the indications of the American standard ASTM D 790-63 and in the conditions of this standard. Water absorption rate after sample immersion during 24 hours in water at 20° C. was valued in the conditions of the French standard NF 38 302.

The obtained results are given in Table 1 hereinafter:

TABLE 1

| Stratified material | Styrene content (percent) at the surface | Flexion resistance (kg./cm.$^2$) | Water absorption [1] |
|---|---|---|---|
| i | 42 | 1,510 | 0.2 |
| $t_1$ | 40 | 1,220 | 0.5 |
| $t_2$ | 40 | 1,290 | 0.4 |

[1] Percent of the weight of the stratified material.

EXAMPLE 2

Example 1 was repeated using the same conditions as in Example 1 by making also three tests, among which two as reference tests but adding in all the cases to the polyester solution in styrene 0.1% of orthohydroxybenzophenone as an absorber of U.V. radiations.

This addition permitted a further increase in the effect of the styrene concentration in the superficial part of the stratified material by working according to the process of the invention (successive irradiations with lamps placed at unequal distance).

The obtained results are given in Table 2.

TABLE 2

| Stratified material | Styrene content (percent) at the surface | Flexion resistance (kg./cm.$^2$) | Water absorption [1] |
|---|---|---|---|
| i' | 43 | 1,550 | 0.1 |
| $t'_1$ | 40 | 1,270 | 0.5 |
| $t'_2$ | 40 | 1,310 | 0.4 |

[1] Percent of the weight of the stratified material.

EXAMPLE 3

In this example the explained hereinabove variant of the process according to the invention was carried out. Therefore, the polyester resin, with 40% by weight of styrene, was first set on the two "Mylar" support-sheets, then it was irradiated during 10 seconds by placing a mercury vapor lamp at a distance of 10 cms from each sheet. Then the glass fiber mat impregnated with resin was applied and the whole was exposed, during 10 minutes, to a series of lamps 7 disposed at 50 cms, on every side of the composite material which moved at a speed of 2 m/min.

The obtained stratified material had a surface content in styrene of 42% (instead of 40% initially); its flexion resistance was 1,550 kg/cm$^2$ and the percentage of absorbed water was 0.1.

It will be obvious to those skilled in the art that various changes may be made without departing from the scope of the invention and the invention is not to be considered limited to what is shown in the drawing and described in the specification.

What is claimed is: of glass

1. In a process of manufacturing stratified materials of glass fibers/unsaturated polyesters by photopolymerization of the polyeste r resin containing an initiating agent impregnating a glass fiber mass, the improvement consisting essentially of exposing the resin/glass fiber mass to luminous ultra violet radiations in two successive periods to effect migration of monomer to the surface of the material, the first radiation consisting of a short and intense irradiation to give rise to a quick surface gelation, while a second longer but less intense irradiation provides the hardening of the stratified material.

2. A process according to claim 1 in which photopolymerization is carried out continuously by passing the polyester resin/glass fibers material between a series of radiation lamps having wave lengths comprised between 1,500 and 5,000 angstroms, the first lamps of which are placed between 5 and 25 cms from the surface to irradiated to provide an intensity of 1–5 watts/cm$^2$ while the second lamps are placed at a further distance, generally 30 to 100 cms, from said surface to provide an intensity of 0.9 to 0.01 watts/cm$^2$.

3. A process according to claim 2 in which the first irradiation phase lasts from 5 to 20 seconds while hardening time, under second lamps exposure, is from 5 to 20 minutes.

4. A process according to claim 1 in which the polyester resin is a styrene solution of a polycondensation product of maleic and phthalic anhydrides with an alkylene glycol.

5. A process according to claim 1 in which the photoinitiator is a benzoin alkyl ether used in an amount of 0.01 to 10% related/the weight of the resin.

6. A process according to claim 5 wherein said resin further has mixed therewith up to 1% by weight of a regulator of U.V. radiation absorption.

7. Stratified materials based on glass fibers and unsaturated polyester resins obtained according to claim 1 wherein the surface of said material is richer in ethylenically unsaturated monomer units than the center thereof.

\* \* \* \* \*